US010255504B2

(12) United States Patent
Castellani et al.

(10) Patent No.: US 10,255,504 B2
(45) Date of Patent: *Apr. 9, 2019

(54) OBJECT POSITION TRACKING USING MOTION ESTIMATION

(71) Applicant: INTERNATIONAL BUSINESS MACHINES CORPORATION, Armonk, NY (US)

(72) Inventors: Marzia E. Castellani, Zagarolo (IT); Roberto Guarda, Pomezia (IT); Roberto Ragusa, Lucera (IT); Alessandro Rea, Naples (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/432,232

(22) Filed: Feb. 14, 2017

(65) Prior Publication Data

US 2017/0200280 A1 Jul. 13, 2017

Related U.S. Application Data

(63) Continuation of application No. 14/990,315, filed on Jan. 7, 2016, now Pat. No. 9,659,380.

(51) Int. Cl.
*G06K 9/00* (2006.01)
*G06T 11/60* (2006.01)
(Continued)

(52) U.S. Cl.
CPC ..... *G06K 9/00744* (2013.01); *G06K 9/00671* (2013.01); *G06K 9/00718* (2013.01);
(Continued)

(58) Field of Classification Search
CPC . G06K 2009/00738; G06K 2009/3291; G06K 9/00671; G06K 9/00718;
(Continued)

(56) References Cited

U.S. PATENT DOCUMENTS 6,795,567 B1  9/2004 Cham et al.
8,917,908 B2  12/2014 Roberts et al.
(Continued)

FOREIGN PATENT DOCUMENTS

EP   1774470 A4   7/2009
WO   2007140523 A1   12/2007
WO   2010086866 A1   8/2010

OTHER PUBLICATIONS

"Object Recognition and Tracking for", accessed Sep. 11, 2015, http://webcache.googleusercontent.com/search?q=cache:RruepEq34IkJ:www.math.
(Continued)

*Primary Examiner* — Manuchehr Rahmjoo
(74) *Attorney, Agent, or Firm* — Michael O'Keefe; Matthew M. Hulihan; Heslin Rothenberg Farley & Mesiti PC

(57) ABSTRACT

Tracking position of at least one object in video frames. The tracking includes processing an initial frame of a set of frames, the processing the initial frame using feature extraction to identify locations of features of the at least one object. The tracking further includes using motion estimation to track locations of the features in subsequent frames of the set of frames, including iteratively performing: obtaining a next frame of the set of frames, and applying a motion estimation algorithm as between the next frame and a prior frame of the set of frames to identify updated locations of the features in the next frame, where locations of the features as identified based on the prior frame are used as input to the motion
(Continued)

estimation algorithm to identify the updated locations of the features in the next frame based on searching less than an entirety of the next frame.

18 Claims, 7 Drawing Sheets

(51) Int. Cl.
   *H04N 5/14* (2006.01)
   *G06T 7/246* (2017.01)
   *G06K 9/32* (2006.01)

(52) U.S. Cl.
   CPC .............. *G06T 7/246* (2017.01); *G06T 11/60* (2013.01); *H04N 5/145* (2013.01); *G06K 2009/00738* (2013.01); *G06K 2009/3291* (2013.01); *G06T 2207/10016* (2013.01); *G06T 2207/30236* (2013.01); *G06T 2207/30241* (2013.01)

(58) Field of Classification Search
   CPC ................ G06K 9/00744; G06T 11/60; G06T 2207/10016; G06T 2207/30236; G06T 2207/30241; G06T 7/246; H04N 5/145
   USPC ........................................................ 382/103
   See application file for complete search history.

(56) References Cited

U.S. PATENT DOCUMENTS

| | | |
|---|---|---|
| 2003/0012410 A1 | 1/2003 | Navab et al. |
| 2008/0273752 A1 | 11/2008 | Zhu et al. |
| 2009/0324018 A1 | 12/2009 | Tell |
| 2010/0150403 A1 | 6/2010 | Cavallaro et al. |
| 2014/0168056 A1 | 6/2014 | Swaminathan et al. |
| 2014/0267790 A1 | 9/2014 | Rabii |
| 2016/0035139 A1 | 2/2016 | Fuchs et al. |

OTHER PUBLICATIONS

Youngmin Park et al., "Multiple 3D Object Tracking for Augmented Reality", 2008, pp. 1-4.

"Motion-Based Multiple Object Tracking", MATLAB, 2013, <https://web.archive.org/web/20130709004800/https://www.mathworks.com/help/vision/examples/motion-based-multiple-object-tracking.html>, 9 pgs.

List of IBM Patents or Applications Treated as Related, dated Feb. 14, 2017, pp. 1-2.

"Object Position Tracking Using Motion Estimation", U.S. Appl. No. 14/990,315, filed Jan. 7, 2016, pp. 1-37.

Office Action in U.S. Appl. No. 14/990,315 dated Jun. 23, 2016, 24 pgs.

Final Office Action in U.S. Appl. No. 14/990,315 dated Nov. 2, 2016, 19 pgs.

Notice of Allowance in U.S. Appl. No. 14/990,315 dated Jan. 6, 2017, 6 pgs.

OBJECT POSITION TRACKING USING MOTION ESTIMATION

BACKGROUND

Augmented reality refers to the simultaneous visualization of real world objects and computer-generated objects presented on a display for a user. Sometimes, though not always, augmented reality applications are used with wearable devices, such as wearable eyewear devices having a transparent display overlaying the lens portions thereof. Computer-generated objects typically overlay relevant objects in real space as captured by a camera. Consequently, because of movement by the relevant objects and/or the user relative to positioning of the camera frame, automatic detection and tracking of the relevant objects is used to accurately superimpose the computer-generated objects on the relevant objects. This can optionally turn the relevant objects into active objects—that is, reactive to click-like or gesture input actions. For object-tracking implementations on wearable and other types of mobile devices, the heaviness of the calculations is a consideration because of the modest computing power available on the mobile devices and the direct correlation between heavy computations, latency and limited battery life.

SUMMARY

Shortcomings of the prior art are overcome and additional advantages are provided through the provision of a computer-implemented method that includes tracking position of at least one object in a plurality of video frames. The tracking includes processing an initial frame of a set of frames of the plurality of video frames, the processing the initial frame using feature extraction to identify locations, in the initial frame, of features of the at least one object. The tracking further includes using motion estimation to track locations of the features in subsequent frames of the set of frames, including iteratively performing: obtaining a next frame of the set of frames, and applying a motion estimation algorithm as between the next frame and a prior frame of the set of frames to identify updated locations of the features in the next frame, where locations of the features as identified based on the prior frame are used as input to the motion estimation algorithm to identify the updated locations of the features in the next frame based on searching less than an entirety of the next frame.

Further, a computer system is provided that includes a memory and a processor in communication with the memory, wherein the computer system is configured to perform a method including: tracking position of at least one object in a plurality of video frames. The tracking includes processing an initial frame of a set of frames of the plurality of video frames, the processing the initial frame using feature extraction to identify locations, in the initial frame, of features of the at least one object. The tracking further includes using motion estimation to track locations of the features in subsequent frames of the set of frames, including iteratively performing: obtaining a next frame of the set of frames, and applying a motion estimation algorithm as between the next frame and a prior frame of the set of frames to identify updated locations of the features in the next frame, where locations of the features as identified based on the prior frame are used as input to the motion estimation algorithm to identify the updated locations of the features in the next frame based on searching less than an entirety of the next frame.

Yet further, a computer program product including a computer readable storage medium readable by a processor and storing instructions for execution by the processor is provided for performing a method that includes: tracking position of at least one object in a plurality of video frames. The tracking includes processing an initial frame of a set of frames of the plurality of video frames, the processing the initial frame using feature extraction to identify locations, in the initial frame, of features of the at least one object. The tracking further includes using motion estimation to track locations of the features in subsequent frames of the set of frames, including iteratively performing: obtaining a next frame of the set of frames, and applying a motion estimation algorithm as between the next frame and a prior frame of the set of frames to identify updated locations of the features in the next frame, where locations of the features as identified based on the prior frame are used as input to the motion estimation algorithm to identify the updated locations of the features in the next frame based on searching less than an entirety of the next frame.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
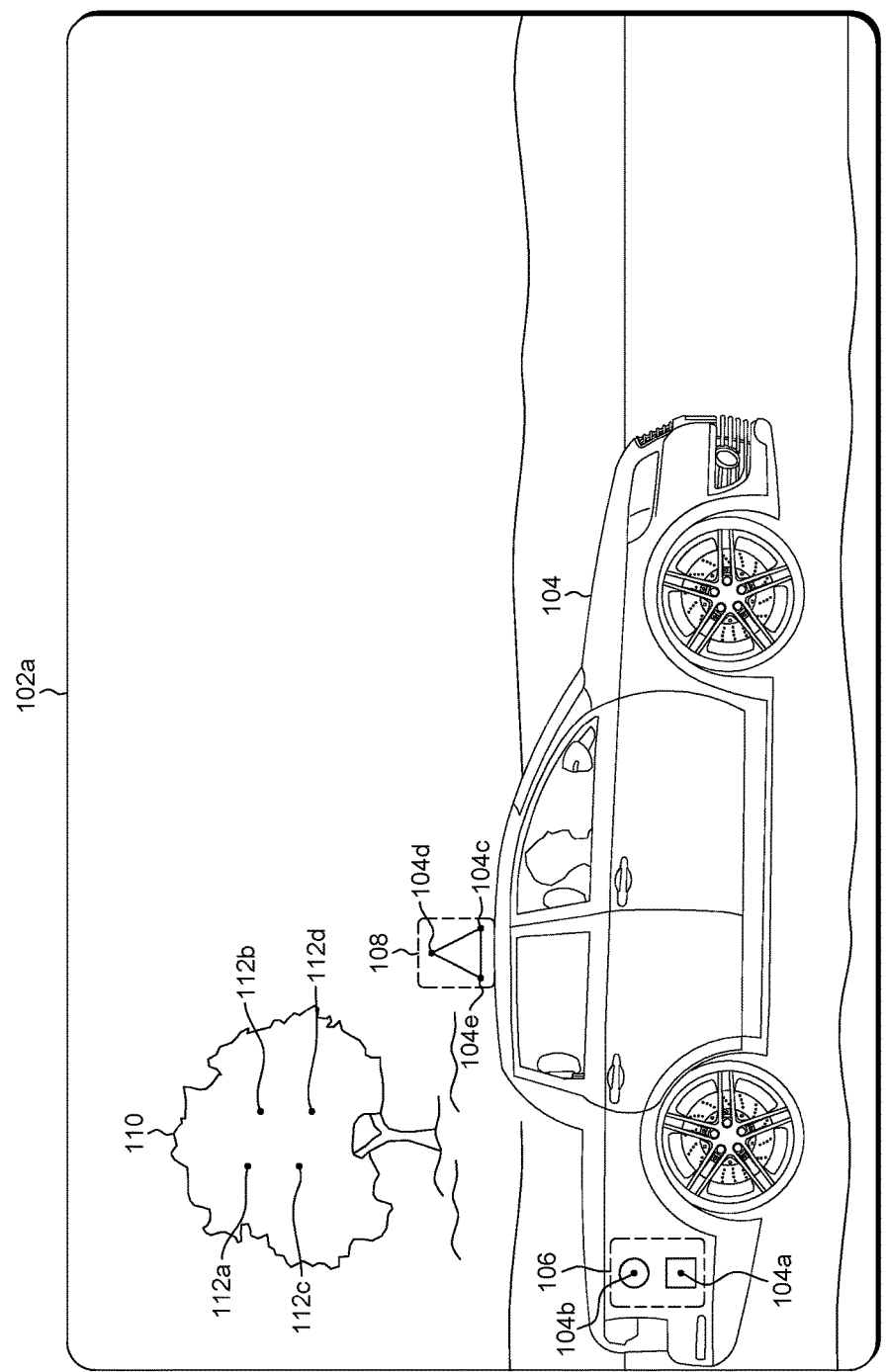
FIGS. 1A and 1B depict example consecutive video frames to illustrate object movement.

Standard feature-based tracking algorithms analyze entire frames to recognize relevant features (points, zones, areas, etc. of interest) and match them with pre-learned objects. In contrast, aspects described herein replace the frame-by-frame algorithms to exploit a reasonable assumption that, in many cases, successive frames are not completely different, in as much as the results obtained from one frame in terms of object positioning are a good starting point to generate results for following frame(s). Accordingly, aspects described herein leverage motion estimation algorithms familiar to the field of video compression and motion compensation. Such algorithms may be efficiently implemented in hardware used on mobile devices, to provide fast, dedicated application of the algorithm to data.

An object recognition and tracking system can be an important component of augmented reality applications because it is the information that determines positioning and what kind of synthetic content is to be overlaid on the video frame. Current algorithms for object recognition are often based on image features, which are a condensed form of some properties of the image in a zone near a specific coordinate. They are a sort of fuzzy hash function—usually a vector of numerical coefficients calculated in a well-defined way. Image features are calculated for zones of the image, which are determined to be interesting or relevant by a preliminary step of the processing. This is usually based on gradient analysis, and attempts to identify zones including borders or corners. This object recognition approach is also referred to as 'feature extraction' or 'feature detection'.

Performing this kind of processing on high-resolution frames at full frame rate is largely unrealistic and/or impractical on mobile hardware with stringent limits on available processor/central processing unit computational power and battery resources. A compromise is therefore generally used in existing approaches: pixel resolution is lowered, frame rate is lowered and/or a focus is placed on continually tuning algorithms to be faster, as examples. The preceding have an impact on the speed and accuracy of the system (objects are often misdetected, the tracking is not fluid, the image quality is adversely affected). Moreover, continually tuning the algorithms to attain only marginal improvement makes it difficult to implement them in specific hardware.

Research in the video compression field demonstrates that in real world live video streams (a sequence of video frames), there is a significant similarity between successive video frames. In particular, it is often the case that similar areas are present in many frames of the sequence if a suitable translation is done on them. Local motion-compensation algorithms incorporating motion estimation algorithms may be efficiently implemented on mobile hardware, as they are currently used in recording live videos on mobile devices. In motion compensation, compensations for camera or object movement are applied for image stability. Aspects leverage this for estimating motion (motion estimation) of relevant features across successive frames.

A subsequent frame may defined in part using data from a prior frame. When it is know that an object to be tracked exists at coordinates (x,y) in a prior frame, a subsequent frame may be checked for a zone (say 20 pixels by 20 pixels) appearing in a prior frame with an anchor position at (x,y) to determine whether the zone appears in a similar form in the subsequent frame. A difference may be determined between what is expected and what exists in the subsequent frame. This may be represented as a sum of the absolute values of the difference, pixel by pixel. If the number is relative high, it indicates a relatively different frame. If the number is relatively low, it indicates a relatively similar frame.

In some examples, an offset provides a smallest number difference as the best match for a zone as between a prior frame and a subsequent frame. If the match is very good (i.e. a very low difference), then the area of exploration (for the zone in the subsequent frame) is considered complete. A decision is made as to whether the best-fit zone in the subsequent frame is similar enough to the feature from the prior frame (albeit shifted in the subsequent frame). If the 'match' is there, it may be concluded that the feature is present in the subsequent frame and is therefore a relevant area in the subsequent frame. This may be repeated for each of several features of a single object to identify the object. There may be, as examples, 5, 10, 20, or more features used to define positioning of a particular object. The offsets of movement for all of the relevant zones may then be used to update the old coordinates of the features in the prior frame and obtain a new map of coordinates for the features (in the subsequent frame). Based on this, an analysis can be performed to understand whether object(s) are still present, and if so, their movement/change in position.

Consequently, the above can be used to identify whether a feature that was present in a prior frame remains present in a subsequent frame, and if so, its movement from a prior position to a subsequent position. If the feature is present and has moved less than some threshold—a measure of the extent of deviation allowed before the feature is considered a (potentially) different feature—then its updated location may be used as the augmented reality-tracked object.

Figure 1B:
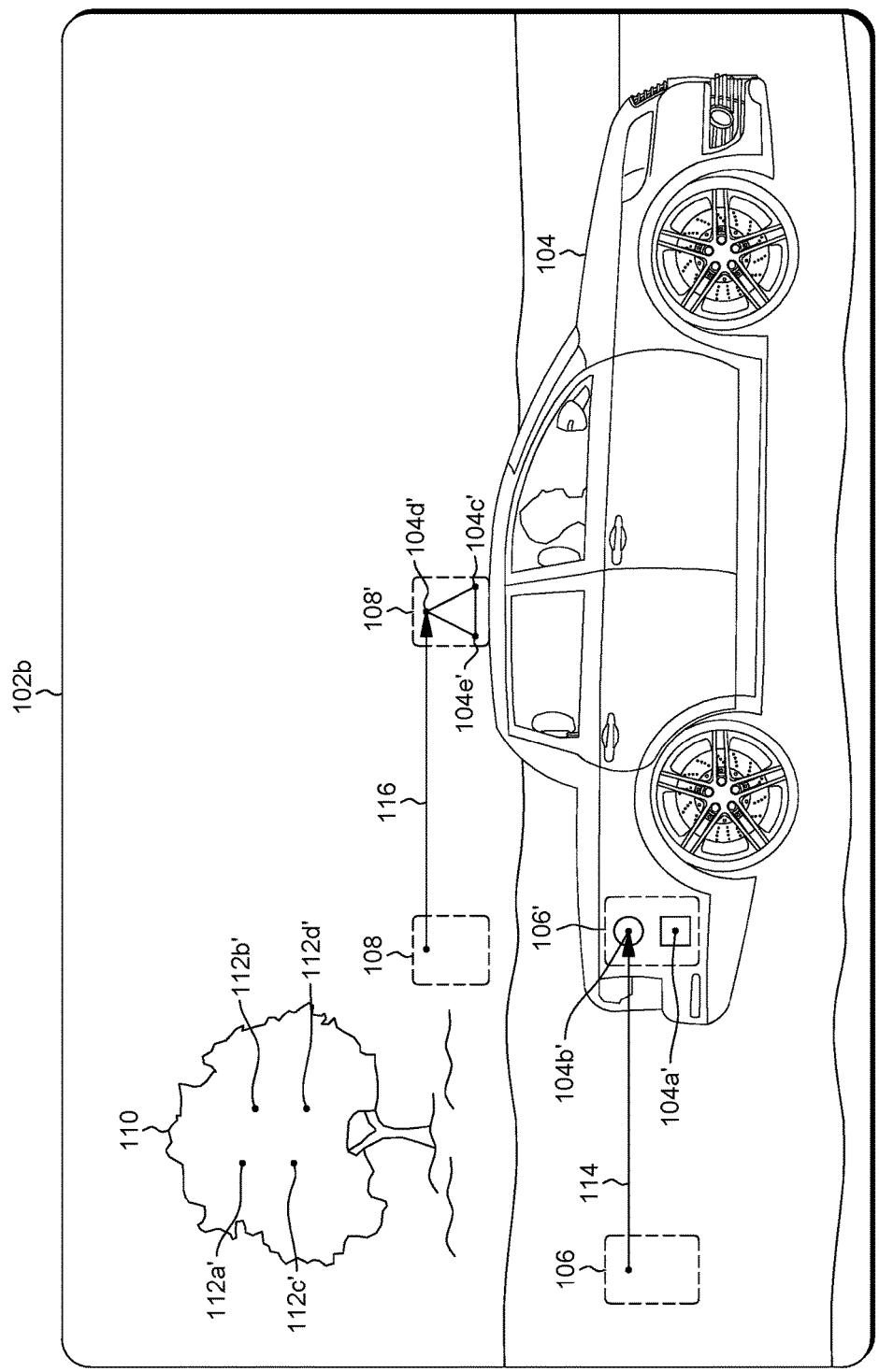

FIGS. 1A and 1B depict example consecutive video frames to illustrate object movement across frames. Referring initially to FIG. 1A, frame 102a depicts in the foreground a taxi 104 in transit from a left portion of the frame to a right portion of the frame. In the background is a (stationary) tree 110 with features denoted by points 112a, 112b, 112c, and 112c.

The taxi 104 includes an area 106 that denotes a logo consisting of a circle and a square (each of which may themselves be considered objects to track) and an area 108 that denotes a triangular a roof sign that, which also in itself may be considered an object to track. In this example, the features being tracked to track position of the taxi object 104 include the circle and square (indicated by points 104a and 104b at their respective centers) and the edges of the roof sign (indicated by points 104c, 104d and 104e. Points 104a-104e indicate features of interest in tracking position of the taxi across frames. In practical implementations, the position of the taxi may be tracked using many more identifying features.

As the taxi moves, its position changes, as is reflected by the updated position in frame 102b of FIG. 1B. It is noted that the camera position in FIGS. 1A and 1B is stationary for illustrative purposes only, but it should be understood that in some embodiments it is movement of the camera and/or the object that causes the object to appear in a different position across multiple frames.

In FIG. 1B, 112a', 112b', 112c' and 112d' indicate updated locations of the features 112a, 112b, 112c, and 112d, and it is noted that their positions have not changed because the tree is stationary and the camera position is (in this example) also stationary. Areas 106' and 108' indicate generally the new locations of the logo and roof sign, and more specifically 104a' and 104b' indicate updated positions for the centers of the circle and square, respectively, and 104c', 104d' and 104e' indicating updated positions for the points on the edges of the roof sign. Prior position for these areas from FIG. 1A (denoted by 104 and 108) are shown in FIG. 1B for convenience, and to illustrate motion vectors 114 and 116. These motion vectors illustrate the direction and extent (distance) in the shift in position between frame 102a and 102b for features denoted by 104b/104b' and 104d/104d'. That is, the circle feature denoted by 104b (an x-y coordinate of the center of the circle) has a new position denoted by 104b' in frame 102b, and vector 114 describes the shift in position. Vector 116 describes the shift in position of the upper edge of the roof sign (104d to 104d'). Assuming the position of each feature remains constant between frame acquisitions, that is the roof sign does not move relative to the circle, then the vectors will match. Based on motion vectors matching (or being within some threshold of similarity) in terms of direction and magnitude, then they accurately describe the motion of the taxi object 104 as a whole across frames 102a and 102b.

An analysis is performed on zones where the features have been extracted, looking at specific parts of the taxi. Any features of the object to be tracked may be examined. In this example, a logo toward the back of the vehicle and a sign atop the roof of the taxi are examined, though different or additional features, such as tire(s), a border of the side mirror, an occupant of the vehicle, etc. may be examined.

In order to track the movement of the features, one or more coordinates, such as a center or anchor coordinate(s), for each relevant feature will be used to define a relevant area, or block to search for in subsequent frame(s). This is typically square and a fixed dimension, such as 8×8 or 16×16 pixels, as examples. That block, or at least a patch substantially similar to that block, will be searched-for in a larger area in subsequent frame(s). As an example, the larger search area for the subsequent frame will be anchored at the location of the center point of the feature in the prior frame and cover a radius of 50 or 100 pixels from that point, as examples. Generally, though not always, the search is not performed for every possible position in the larger search area—there is some optimization that may be applied, for instance an offset that searches every 3 or 4 pixels for a match of the block.

Also noteworthy is that motion compensation/estimation can detect objects that are growing or shrinking in dimension across a sequence of frames, such as when the object is getting nearer to or farther from the camera, or when the camera zooms in or out.

By way of example, a smart object tracking approach for a plurality of input video frames is now presented as follows. In an initial (first) frame, a traditional full frame feature-based algorithm is used for feature extraction to detect interesting/relevant features, i.e. points or areas of interest, for instance points on objects to be augmented in an augmented reality application. A list of coordinates corresponding to the points/areas of interest is established. A motion estimation approach is taken for subsequent frames, in which the list of coordinates of interesting areas detected based on feature extraction applied to the initial frame are used as an input to a motion estimation algorithm between a current frame being processed and a previous frame (e.g. the first frame, an immediately preceding frame, or any intervening frame therebetween. If there is a good match between an interesting area initially detected and an area of the current frame (i.e. a difference between the two areas is lower than a threshold), the area in the current frame, which corresponds to the 'original coordinate(s) plus a detected motion delta' is considered interesting, meaning it is the updated location of the initially detected interesting area. This has been identified absent/without repeating the feature extraction algorithm against the initial frame, and the feature(s) identified in the first frame is/are assumed to remain valid, for object tracking purposes, without running the feature extraction algorithm on the current frame.

The motion estimation approach repeats for subsequent frames until some event occurs that indicates the process should return to the traditional full frame calculation in processing a next frame. An example event is after a given number of 'child' frames (those processed using motion estimation after an initial frame is processed using feature extraction) exceeds a threshold. An example may be 10 child frames, where a maximum of 10 frames succeeding an initial frame processed using feature extraction may be processed using motion estimation. After processing the 10 succeeding frames (or if some other event has been triggered), the process returns to the traditional full frame calculation for feature extraction. It is also noted that the threshold may instead be expressed as a timeframe (for instance 0.2 seconds), in which the full-frame based feature extraction is employed at least every 0.2 seconds. It is further noted that the threshold may be predefined, or it may be dynamically determined based on complexity of the frames to be processed or other considerations that dictate how often it would be appropriate to return to the feature extraction algorithm to re-establish the list of interesting features being tracked. In a typical situation, the decision to return more or less frequently to the full-frame processing is based on how confident the process is in correlating the features across the frames through motion estimation.

Another example event occurs when an output of the motion estimation output is worse than a threshold. If the algorithm is unable to confidently find a frame correlation, the frames are probably too different.

Yet another example event is raised when a scene change analysis detects that the current frame is different enough from a previous frame that a scene change is detected. Sudden camera movements, entrance of new objects into field of view, and camera cutaways are just some examples of a scene change. Scene change analysis and detection can be a relatively lightweight process in terms of computing cost and speed—so lightweight that in some examples it is performed in parallel with the object tracking described herein. Furthermore, many augmented reality scenarios involve a continuous camera shot from a single camera taken from the perspective of the viewer, in which case scene changes are unlikely to occur as frequently as they might in prior-produced videos. The scene change detection algorithm may therefore optionally be tailored to recognize only the most obvious or pronounced scene changes, to thereby reduce the demand for resources by the scene detection algorithm and speed up its processing. It is possible to perform scene change detection on every frame in real-time without producing latency noticeable by the user.

Figure 2:
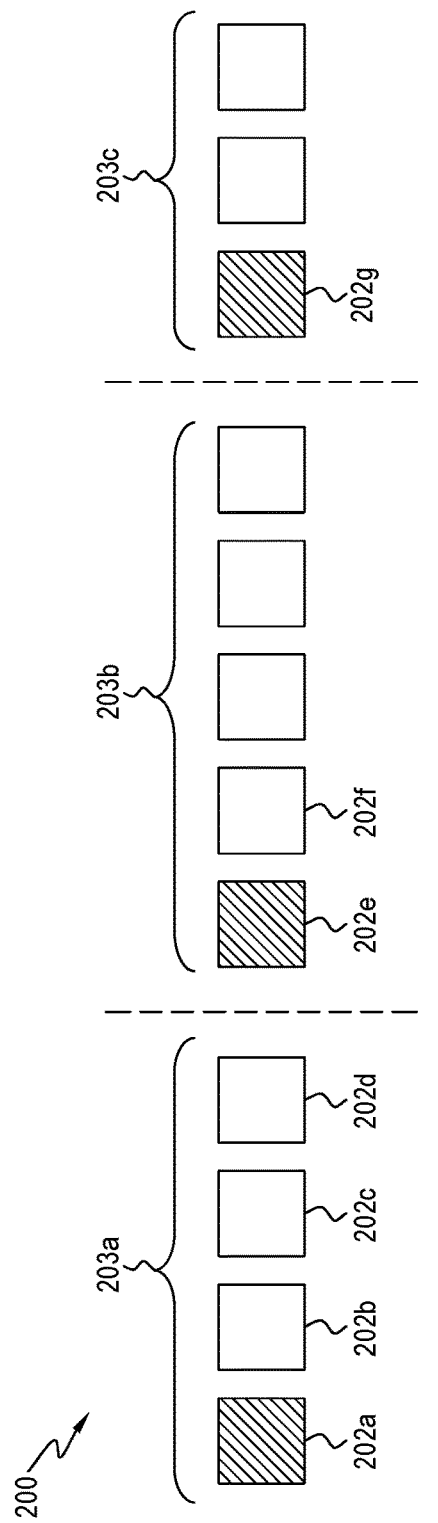
FIG. 2 depicts an example video frame sequence showing sets of frames across which object positioning is tracked in accordance with aspects described herein.

The processing can proceed from feature extraction applied to an initial frame to motion estimation processing on subsequent frames, and repeats this one or more times across a plurality of frames, for instance those in a live video stream captured by a device and processed in real-time according to the above. This results in a frame sequence being processed in discrete sets, each including an initial frame of the set followed by zero or more subsequent frames of the set. FIG. 2 depicts an example video frame sequence showing sets of frames across which objection positioning is tracked in accordance with aspects described herein. A sequence of frames 200 is shown in chronological order from left to right (202a, 202b, 202c, . . . ). An initial frame 202a is processed using full-frame feature extraction to identify locations in that frame of features of one or more objects to be tracked. In accordance with aspects described herein, motion estimation is used to track locations of those features in subsequent frames 202b, 202c and 202d, in which a motion estimation algorithm is applied between each successive frame 202b, 202c and 202d and a prior frame (such as frame 202a) to identify locations of the features. The locations of the features as identified based on the prior frame are used as input to the motion estimation algorithm. As an example, when processing frame 202c, a motion estimation algorithm is applied as between frame 202c and frame 202b or 202a in which the locations of the features as identified based on the prior frame (i.e. 202b or 202a) are input to the motion estimation algorithm to identify the updated locations of those features in frame 202c.

Frame 202d is processed after processing frame 202c. Based on some event, such as meeting/exceeding a threshold number of frames processed, lapse of a timeframe since processing frame 202a, or detecting a scene change as between frame 202*d* and 202*e*, the processing of the stream returns to full frame feature-based detection for frame 202*e*. This event defines an end of the first set of frames 203*a* in the plurality of frames in sequence 200, and the start of a next set of frames, 203*b*, in sequence 200. It is noted in this regard that a set may be dynamically defined, in terms of the frames included there, based on occurrence of an event that signifies an end of the set, and this may be determined in real-time as the frames are processed, in one example. Additionally or alternatively, if the sequence of video frames is obtained at some prior time, pre-processing of the frames can be performed to identify the sets before processing thereof, if desired.

Accordingly, the approach repeats, in which initial frame 202*e* (of set 203*b*) is processed using full-frame feature extraction to identify locations in that frame of features of one or more objects being tracked, and a motion estimation algorithm is applied between each of the subsequent frames (202*f* etc.) of set 203*b* and a prior frame from that set to identify locations of the features. It is noted that the feature extraction performed on frame 202*e* may identify some, all, or none of the same features that were detected and tracked across set 203*a*, and/or may detect new features that appear in set 203*b*.

Set 203*b* is processed as above, and, upon occurrence of an event, a next set 203*c* with initial frame 202*g* is processed. This repeats for all sets in the sequence, of which only sets 203*a*, 203*b* and 20*c* are show in FIG. 2.

As an enhancement to aspects described herein, different frame areas can be established across a set or sets of frames, and application of feature extraction or motion estimation to any given frame area can be made selectively for that frame area. As an example, if a frame area such as the upper left quadrant of each frame of a group of frames includes especially complex content for which the more intensive full feature extraction is most appropriate but the content in the remaining three quadrants across that group of frames is relatively less complex and appropriate for motion estimation-based feature tracking as described herein, then an initial frame may be processed using full frame feature extraction, and subsequent frames of the group may be processed using a combination of feature extraction, for the upper left quadrant, and motion estimation, for the other three quadrants. In another example, half of each frame in the group of frames is processed using full feature extraction while the other half is processed using a motion estimation algorithm.

Additionally or alternatively, the frame area(s) being processed with full feature extraction may vary across the group of frames as the relatively complex content changes position across the frames. For instance, the complex content may be tracking across an otherwise stationary view presented in the group of frames, in which case the full feature extraction may be performed in frame areas that also track the positioning of the complex content. Thus, unlike the example above where the upper left quadrant of each frame of the group of frames is processed with feature extraction, the frame areas being processed using feature extraction may shift across the frames of the group to track the positioning of the (complex) content as it repositions and the process detects that repositioning.

In a typical practical implementation, the majority of frames in a sequence of video frames to be augmented will be processed using motion estimation to track position of features, and therefore objects, across the sequence of video frames. In other words, events that would define a start of a next set, and therefore trigger full frame processing for the initial frame of that next set, may be relatively infrequent. Even if the process returns to full frame processing an average of once every five frames, this results in an 80% reduction in full-frame processing, which as described above may be significantly more intensive in terms of processing demand and power consumption than motion estimation processing to identify updated locations for the features. Consequently, the system is provided substantially better performance characteristics. As a result, it may not be necessary to reduce quality, accuracy, and/or fluidity in order to accomplish adequate position tracking in real-time, unlike is often the case where full-frame processing is performed against each frame. To the contrary, there may be a net gain in system performance. Any such net gain in system performance resulting from application of aspects described herein may be leveraged in different ways. In a simple example, the processing of a frame finishes faster than a target time for completion and the processor can sleep until the next frame is received for processing. This improves battery life at the least. Additionally or alternatively, the gain in system performance may be spent on increasing framerate and/or frame resolution. Some augmented reality applications may presently be forced to run at relatively low framerates, for instance 5 or 10 frames per second, to accommodate the relatively intense full-frame processing. However, the gain in system performance resulting from aspects described herein may be spent to run the application at an increased framerate, for instance 20 frames per second.

Figure 3:
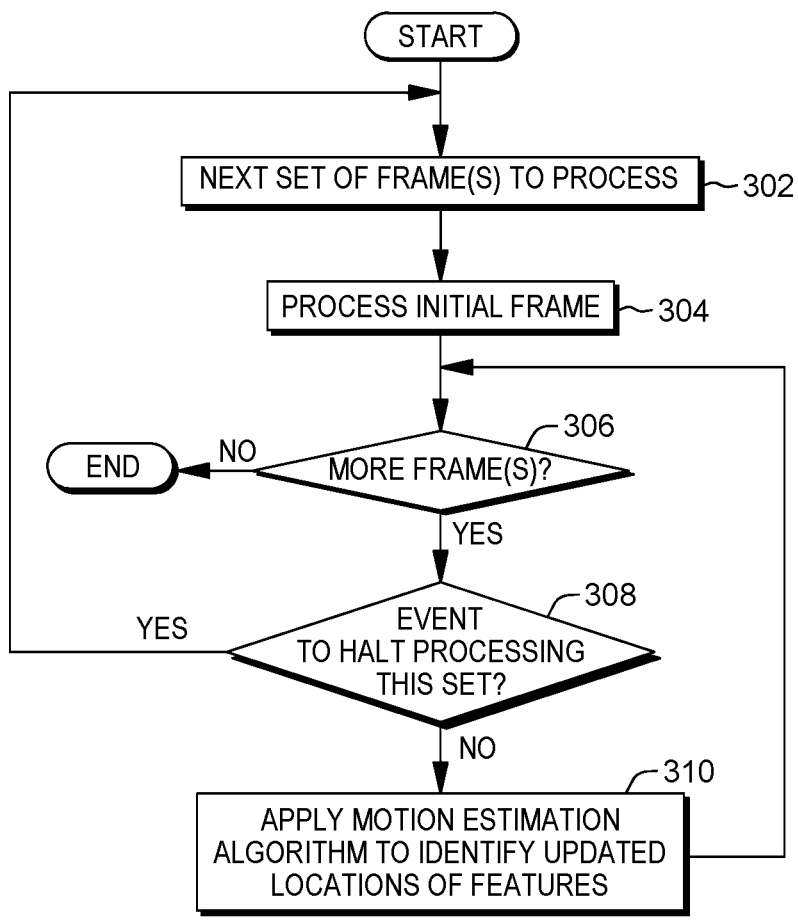
FIG. 3 depicts an example process for tracking position of at least one object in a plurality of video frames, in accordance with aspects described herein.

Accordingly, processes for tracking position of at least one object in a plurality of video frames are provided in accordance with aspects described herein. FIG. 3 depicts an example such process, which may be performed by a computer system providing tracking capabilities for an augmented reality application, for instance. One example of such a computer system is a wearable device.

The process of FIG. 3 begins upon invoking the process against some sequence of frames, for instance a sequence of incoming frames from a live, real-time video feed, as one example. Given this sequence of frames, there is necessarily a next (e.g. first) set of frame(s) to process (302), which commences an outer loop for processing the frame(s) of that set. The process proceeds by processing the initial frame of that set (304) using feature extraction to identify locations, in the initial frame, of features of the at least one object. The process then continues by determining whether more frame(s) in the sequence exist (306). If not, the process ends. Otherwise, it is determined at (308) whether occurrence of an event is recognized that would halt processing this set of frame(s), thereby iterating the outer loop by moving onto a next set in processing the next frame in the sequence. If no such occurrence of an event is recognized, the process applies a motion estimation algorithm against the next frame and a prior frame of the set to identify updated locations of the features that were identified in processing the initial frame (310). Then, this inner loop of processing next frame(s) in the set, if they exists, iterates by returning to (306). Again, if no more frame(s) are present in the sequence, then the process ends, otherwise the process continues for the next frame, which is either the start of a next set (308—YES) or a next frame in the set of frames and therefore processed using a motion estimation algorithm (310).

If at some point in processing the occurrence of an event is recognized to halt processing of the current set (308—YES), then the process breaks from the inner loop (i.e. processing subsequent frames in the current set) and iterates the first loop to begin processing the next set of frames (302), beginning with that next frame, which is the initial frame of the next set. Eventually, the process ends while processing a current set, e.g. when it is determined that no more frame(s) in the sequence exists (306—NO).

Thus, tracking position of at least one object in a plurality of video frames is provided, the tracking including processing (304) an initial frame of a set of frames of the plurality of video frames, the processing the initial frame using feature extraction to identify locations, in the initial frame, of features of the at least one object. Then motion estimation is used in tracking the features (and therefore objects) in subsequent frame(s) of the set. A decision is made as to whether more frames in the sequence exist (306), and if so, whether an event is recognized that indicates a halt in processing the next frame because an end of the current set of frames has been reached. If no event is recognized, use of motion estimation to track locations of the features in subsequent frame(s) of the set of frame includes iteratively performing obtaining a next frame of the set of frames (if it was not already obtained, for instance to determine whether a next set has been encountered (308—YES)) and applying a motion detection algorithm (310) as between the next frame and a prior frame of the set of frames to identify updated locations of the features in the next frame, where locations of the features as identified based on the prior frame may be used as input to the motion estimation algorithm to identify the updated locations of the features in the next frame.

At each iteration of the iteratively performing, the prior frame may be the initial frame of the current set or may be a frame immediately preceding the next frame, as examples.

The tracking position of the at least one object further includes recognizing the occurrence of the event and halting the iteratively performing (308—YES) based on recognizing the occurrence of the event, where halting defines the end of the current set of frames. At that point, based on recognizing the occurrence of such an event and halting the iteratively performing for that current set, tracking position of the at least one object further includes returning to process the next set of frames. Therefore, for each additional set of one or more subsequent sets of frames of the plurality of video frames, the processing an initial frame and the using motion estimation to track locations of the features is repeated, where processing the initial frame (304) of a respective additional set uses feature extraction to identify locations, in the initial frame of the additional set, of the features, and the using motion estimation to track locations of the features in subsequent frames of the additional set includes iteratively performing the obtaining a next frame and the applying the motion detection algorithm (310) as between the next frame and a prior frame of the additional set of frames.

The locations of the features in a frame may define position of the at least one object. Repeating, for the one or more subsequent sets of frames, the processing the initial frame and the using the motion detection algorithm to track locations of the features provides tracking position of the at least one object across the plurality of video frames of the sequence.

An event that defines an end of a current set of frames and the start of a next set of frames can be any of various events to indicate re-establishment of feature identification by triggering full frame processing using feature extraction. Accordingly, and by way of example, recognizing occurrence of such an event can include one or more of the following:

determining that a threshold number of subsequent frames of the set of frames have been processed to track the locations of the features in the subsequent frames;

determining that a timeframe has lapsed since processing the initial frame of the set of frames;

determining that an output of the motion detection algorithm is worse than a threshold value;

performing a scene change analysis at each iteration of the iteratively performing, to detect whether a scene change in the plurality of video frames has occurred, and recognizing occurrence of the event based on detecting that a scene change has occurred.

As an enhancement, the feature extraction might identify one or more locations, in the initial frame, of other features of another object, the another object being in a different frame area than the at least one object for which position is being tracked. In this case, processing can include tracking position of the another object using feature extraction in the different frame area of the subsequent frames of the set of frames to track locations of the other features of the another object in the subsequent frames of the set of frames.

Aspects described herein can be applied to augmented reality, in which aspects described herein can establish, as part of an augmented reality application, an active element on a display of a user device, the active element overlaying an object, of the at least one object for which position is tracked, in the plurality of video frames based on the tracking the position of the object in the plurality of video frames.

Processes described herein may be performed singly or collectively by one or more computer systems, such as computer system(s) described below with reference to FIGS. 4 and 5. In some examples, such a computer system that performs process(es) described herein is a wearable device on which an augmented reality application is presented. Additionally or alternatively, a remote computer system in communication with such computer system performs process(es) described herein. As a third possibility, a combination of a (i) computer system and (ii) remote computing system(s) perform process(es) described herein.

Figure 4:
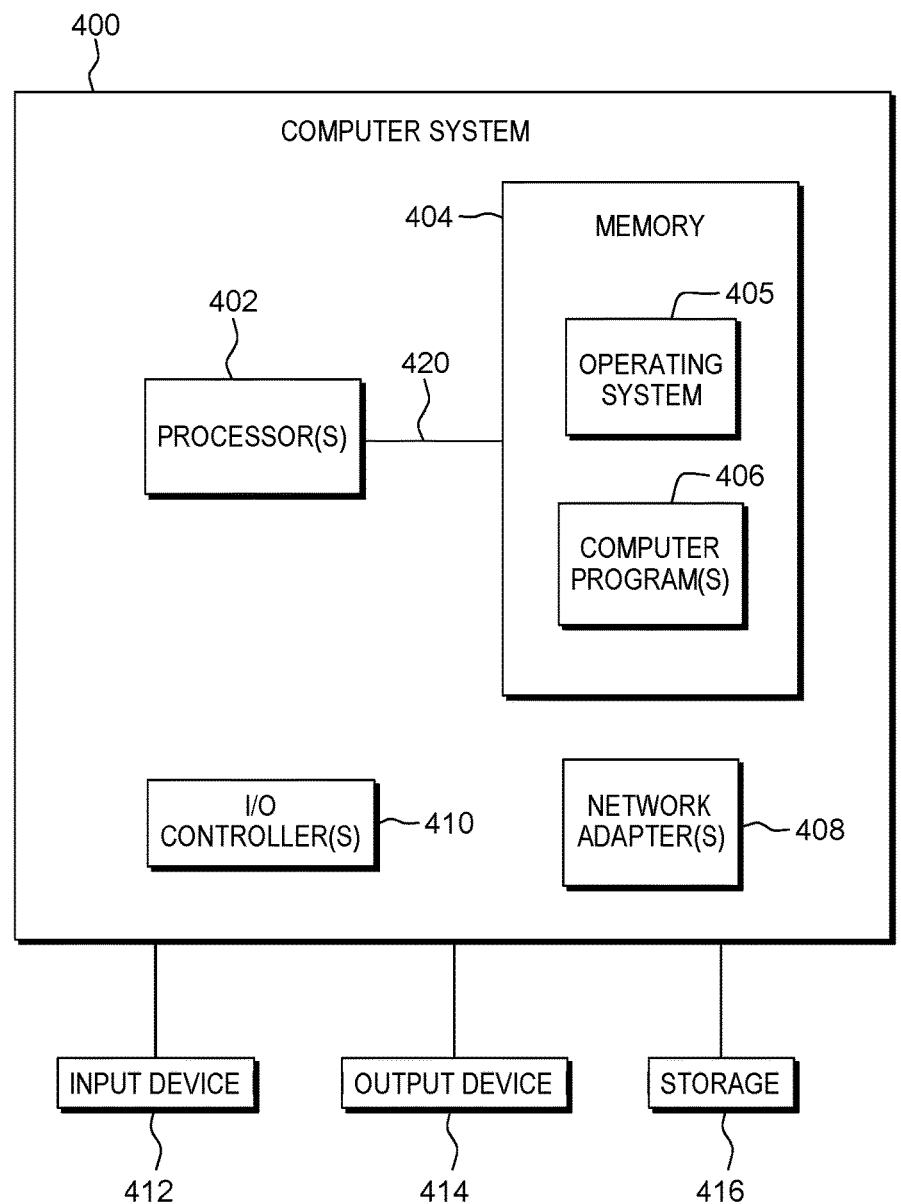
FIG. 4 depicts an example of a computer system to incorporate or use aspects described herein.

FIG. 4 depicts one example of a computer system to incorporate and use aspects described herein. A computer system may also be referred to herein as a processing device/system or computing device/system, or simply a computer. Computer system 400 may be based on one or more of various system architectures such as those offered by International Business Machines Corporation (Armonk, N.Y., USA) or Intel Corporation (Santa Clara, Calif., USA), as examples.

Computer system 400 is suitable for storing and/or executing program code and includes at least one processor 402 coupled directly or indirectly to memory 404 through, e.g., a system bus 420. In operation, processor(s) 402 obtain from memory 404 one or more instructions for execution by the processors. Memory 404 may include local memory employed during actual execution of the program code, bulk storage, and cache memories which provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and one or more computer programs 406, for instance programs to perform aspects described herein.

Input/Output (I/O) devices 412, 414 (including but not limited to displays, microphones, speakers, accelerometers, gyroscopes, magnetometers, light sensors, proximity sensors, GPS devices, cameras, etc.) may be coupled to the system either directly or through I/O controllers 410.

Network adapters 408 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 408 used in computer system.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402 in a manner known in the art.

The computer system 400 may include fewer components than illustrated, additional components not illustrated herein, or some combination of the components illustrated and additional components. Computer system 400 may include any computing device known in the art, such as a mainframe, server, personal computer, workstation, laptop, handheld or mobile computer, tablet, wearable device, telephony device, network appliance, virtualization device, storage controller, etc.

Figure 5:
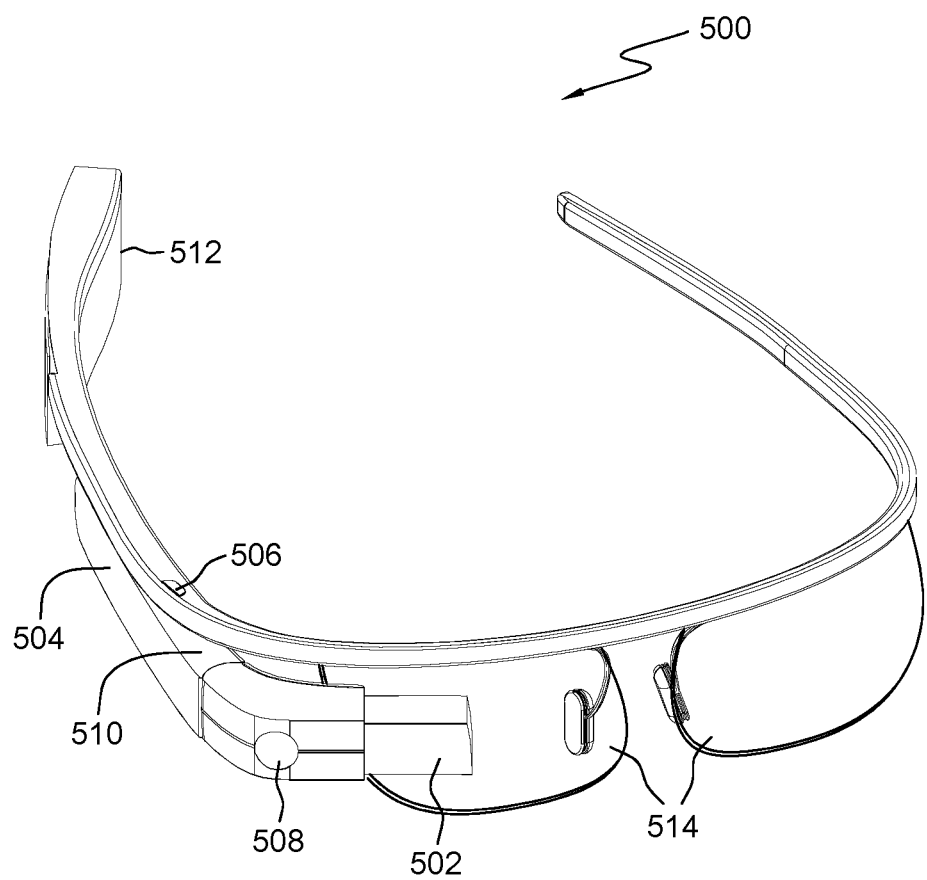
FIG. 5 depicts an example of a wearable device to incorporate or use aspects described herein.

FIG. 5 depicts another example of a computer system to incorporate and use aspects described herein. FIG. 5 depicts an example eyewear wearable device. Device 500 can include many of the same types of components included in computer system 400 described above. In the example of FIG. 5, device 500 is configured to be wearable on the head of the device user. The device includes one more displays, such as a display 502 that is positioned in a peripheral vision line of sight of the user when the device is in operative position on the user's head. Suitable displays can utilize LCD, CRT, or OLED display technologies, as examples. Lenses 514 may optionally include active translucent displays, in which an inner and/or outer surface of the lenses are capable of displaying images and other content. This provides the ability to impose this content directly into the line of sight of the user, overlaying at least part of the user's view to the environment through the lenses. In particular embodiments for use with aspects described herein, content presented on the lens displays includes content that augments objects in the user's view when looking through the lens displays. As a specific example, a camera of the wearable device 500 obtains images (frames) of the environment, tracks positioning of objects of the environment, and uses this positioning in superimposing content onto the lens display to augment the objects being tracked.

Device 500 also includes touch input portion 504 that enable users to input touch-gestures in order to control functions of the device. Such gestures can be interpreted as commands, for instance a command to take a picture, or a command to launch a particular service or application. Device 500 also includes button 506 in order to control function(s) of the device. Example functions include locking, shutting down, or placing the device into a standby or sleep mode.

Various other input devices are provided, such as camera 508, which can be used to capture images or video. The camera can also be used by the device to obtain an image of the user's view of his or her environment to use in, for instance, capturing images/videos of a scene. One or more microphones, proximity sensors, light sensors, accelerometers, speakers, GPS devices, and/or other input devices (not labeled) may be additionally provided, for instance within housing 510. Housing 510 can also include other electronic components, such as electronic circuitry, including processor(s), memory, and/or communications devices, such as cellular, short-range wireless (e.g. Bluetooth), or WiFi circuitry for connection to remote devices. Housing 510 can further include a power source, such as a battery to power components of device 500. Additionally or alternatively, any such circuitry or battery can be included in enlarged end 512, which may be enlarged to accommodate such components. Enlarged end 512, or any other portion of device 500, can also include physical port(s) (not pictured) used to connect device 500 to a power source (to recharge a battery) and/or any other external device, such as a computer. Such physical ports can be of any standardized or proprietary type, such as Universal Serial Bus (USB).

Figure 6:
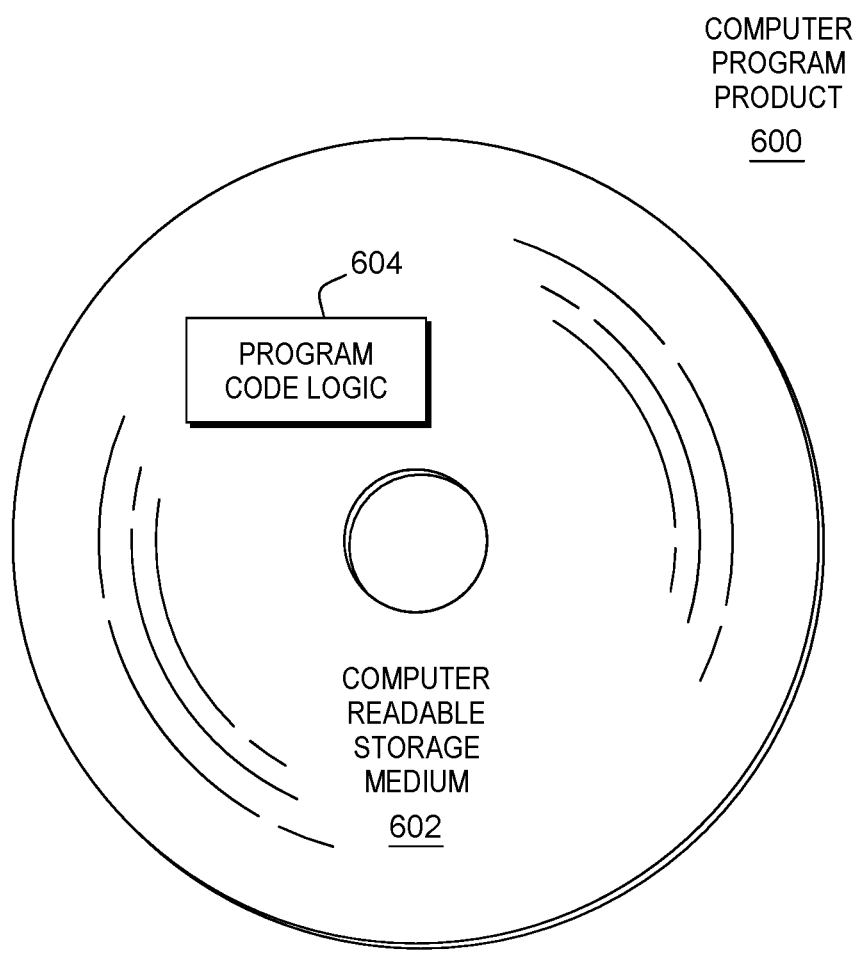
FIG. 6 depicts one embodiment of a computer program product.

Referring to FIG. 6, in one example, a computer program product 600 includes, for instance, one or more computer readable storage media 602 to store computer readable program code means, logic and/or instructions 604 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    tracking position of at least one object in a plurality of video frames, the tracking comprising:
    processing an initial frame of a set of frames of the plurality of video frames, the processing the initial frame using feature extraction to identify locations, in the initial frame, of features of the at least one object; and
    using motion estimation to track locations of the features in subsequent frames of the set of frames, comprising iteratively performing:
    obtaining a next frame of the set of frames; and
    applying a motion estimation algorithm as between the next frame and a prior frame of the set of frames to identify updated locations of the features in the next frame, wherein locations of the features as identified based on the prior frame are used as input to the motion estimation algorithm to identify the updated locations of the features in the next frame based on searching less than an entirety of the next frame, and wherein, for a feature of the features, the motion estimation algorithm finds the feature in the next frame by searching a search area, of the next frame, that is less than the entirety of the next frame, and the search area is based on an anchor point of the feature in the prior frame.

2. The method of claim 1, wherein the features of the at least one object comprise a first set of features in a first frame area, wherein the method further identifies a second set of features, the second set of features being features of at least one other object, the at least one other object being in a second frame area, different from the first frame area, and wherein the method uses, for each subsequent frame of one or more subsequent frames of the set of frames, motion estimation in tracking the first set of features in the first frame area to track the at least one object and feature extraction in tracking the second set of features in the second frame area to track the at least one other object.

3. The method of claim 1, wherein the tracking position of the at least one object further comprises:
 recognizing occurrence of an event; and
 halting the iteratively performing based on recognizing the occurrence of the event, the halting defining the end of the set of frames.

4. The method of claim 3, wherein recognizing occurrence of the event comprises determining that a threshold number of subsequent frames of the set of frames have been processed to track the locations of the features in the subsequent frames.

5. The method of claim 3, wherein recognizing occurrence of the event comprises determining that a timeframe has lapsed since processing the initial frame of the set of frames.

6. The method of claim 3, wherein recognizing occurrence of the event comprises determining that an output of the motion detection algorithm is worse than a threshold value.

7. The method of claim 3, wherein the tracking position of the at least one object further comprises:
 performing a scene change analysis at each iteration of the iteratively performing to detect whether a scene change in the plurality of video frames has occurred; and
 recognizing occurrence of the event based on detecting that a scene change has occurred.

8. The method of claim 1, wherein at each iteration of the iteratively performing, the prior frame is the initial frame or is a frame immediately preceding the next frame.

9. The method of claim 1, further comprising establishing, as part of an augmented reality application, an active element on a display of a user device, the active element overlaying an object, of the at least one object, in the plurality of video frames based on the tracking the position of the object in the plurality of video frames.

10. A computer system comprising:
 a memory; and
 a processor in communication with the memory, wherein the computer system is configured to perform a method, the method comprising:
 tracking position of at least one object in a plurality of video frames, the tracking comprising:
 processing an initial frame of a set of frames of the plurality of video frames, the processing the initial frame using feature extraction to identify locations, in the initial frame, of features of the at least one object; and
 using motion estimation to track locations of the features in subsequent frames of the set of frames, comprising iteratively performing:
 obtaining a next frame of the set of frames; and
 applying a motion estimation algorithm as between the next frame and a prior frame of the set of frames to identify updated locations of the features in the next frame, wherein locations of the features as identified based on the prior frame are used as input to the motion estimation algorithm to identify the updated locations of the features in the next frame based on searching less than an entirety of the next frame, and wherein, for a feature of the features, the motion estimation algorithm finds the feature in the next frame by searching a search area, of the next frame, that is less than the entirety of the next frame, and the search area is based on an anchor point of the feature in the prior frame.

11. The computer system of claim 10, wherein the features of the at least one object comprise a first set of features in a first frame area, wherein the method further identifies a second set of features, the second set of features being features of at least one other object, the at least one other object being in a second frame area, different from the first frame area, and wherein the method uses, for each subsequent frame of one or more subsequent frames of the set of frames, motion estimation in tracking the first set of features in the first frame area to track the at least one object and feature extraction in tracking the second set of features in the second frame area to track the at least one other object.

12. The computer system of claim 10, wherein the tracking position of the at least one object further comprises:
 recognizing occurrence of an event; and
 halting the iteratively performing based on recognizing the occurrence of the event, the halting defining the end of the set of frames.

13. The computer system of claim 12, wherein recognizing occurrence of the event comprises at least one selected from the group consisting of: (i) determining that a threshold number of subsequent frames of the set of frames have been processed to track the locations of the features in the subsequent frames, (ii) determining that a timeframe has lapsed since processing the initial frame of the set of frames, and (iii) determining that an output of the motion detection algorithm is worse than a threshold value.

14. The computer system of claim 12, wherein the tracking position of the at least one object further comprises:
 performing a scene change analysis at each iteration of the iteratively performing to detect whether a scene change in the plurality of video frames has occurred; and
 recognizing occurrence of the event based on detecting that a scene change has occurred.

15. A computer program product comprising:
 a computer readable storage medium readable by a processor and storing instructions for execution by the processor for performing a method comprising:
 tracking position of at least one object in a plurality of video frames, the tracking comprising:
 processing an initial frame of a set of frames of the plurality of video frames, the processing the initial frame using feature extraction to identify locations, in the initial frame, of features of the at least one object; and
 using motion estimation to track locations of the features in subsequent frames of the set of frames, comprising iteratively performing:
 obtaining a next frame of the set of frames; and
 applying a motion estimation algorithm as between the next frame and a prior frame of the set of frames to identify updated locations of the features in the next frame, wherein locations of the features as identified based on the prior frame are used as input to the motion estimation algorithm to identify the updated locations of the features in the next frame based on searching less than an entirety of the next frame, and wherein, for a feature of the features, the motion estimation algorithm finds the feature in the next frame by searching a search area, of the next frame, that is less than the entirety of the next frame, and the search area is based on an anchor point of the feature in the prior frame.

16. The computer program product of claim 15, wherein the features of the at least one object comprise a first set of features in a first frame area, wherein the method further identifies a second set of features, the second set of features being features of at least one other object, the at least one other object being in a second frame area, different from the first frame area, and wherein the method uses, for each subsequent frame of one or more subsequent frames of the set of frames, motion estimation in tracking the first set of features in the first frame area to track the at least one object and feature extraction in tracking the second set of features in the second frame area to track the at least one other object.

17. The computer program product of claim 15, wherein the tracking position of the at least one object further comprises:
  recognizing occurrence of an event; and
  halting the iteratively performing based on recognizing the occurrence of the event, the halting defining the end of the set of frames.

18. The computer program product of claim 17, wherein recognizing occurrence of the event comprises at least one selected from the group consisting of: (i) determining that a threshold number of subsequent frames of the set of frames have been processed to track the locations of the features in the subsequent frames, (ii) determining that a timeframe has lapsed since processing the initial frame of the set of frames, and (iii) determining that an output of the motion detection algorithm is worse than a threshold value.

* * * * *